Oct. 27, 1970 W. A. WORK 3,536,501
FOOD PACKAGE AND METHOD OF MAKING SAME
Filed Sept. 25, 1968
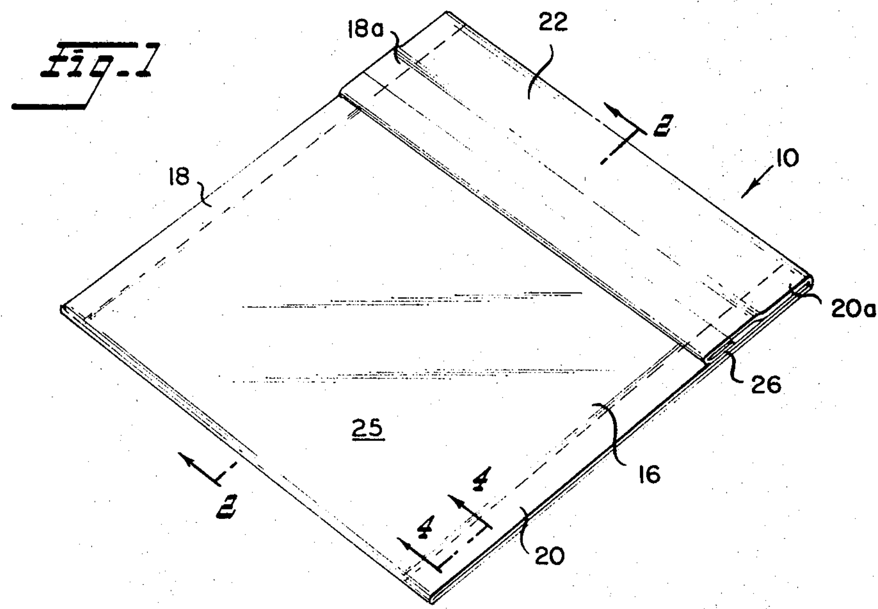
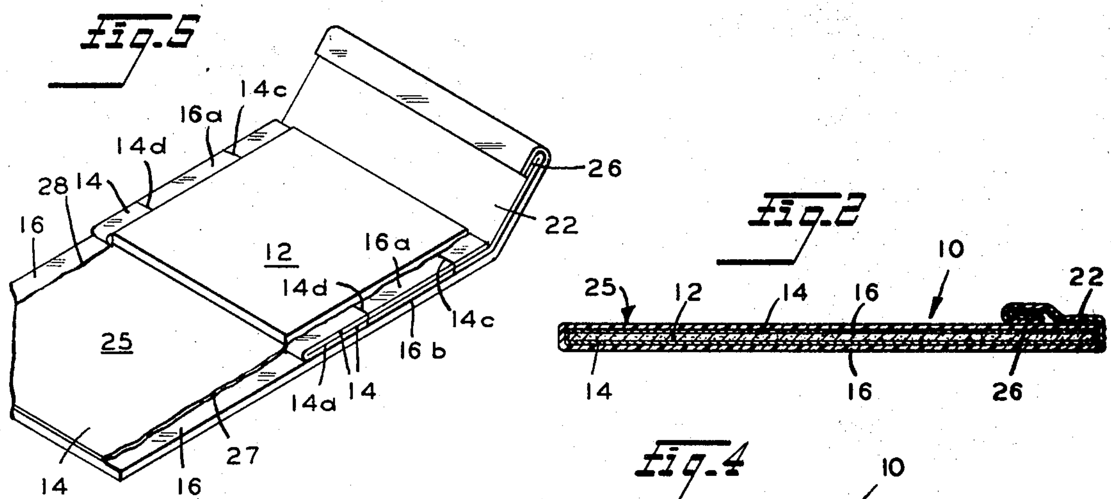
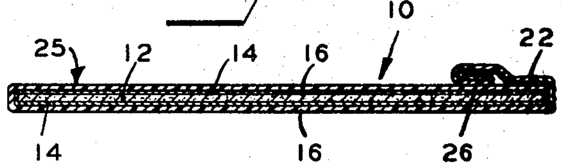
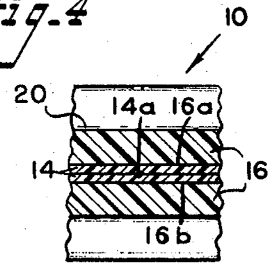
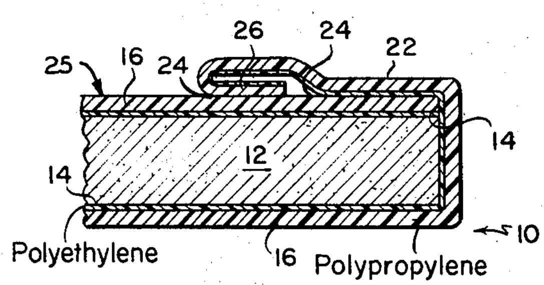
INVENTOR
*William Anthony Work*
BY [signature]
ATTORNEY United States Patent Office 3,536,501

Patented Oct. 27, 1970

1

3,536,501

FOOD PACKAGE AND METHOD OF MAKING SAME

William Anthony Work, Neenah, Wis., assignor to American Can Company, New York, N.Y., a corporation of New Jersey Filed Sept. 25, 1968, Ser. No. 762,501
Int. Cl. B65b *25/06*
U.S. Cl. 99—171 11 Claims

ABSTRACT OF THE DISCLOSURE

Individually sliced food products are wrapped in a flexible plastic material which will not absorb moisture from the food product. The wrapping material comprises a laminate one layer of which is heat sealable to itself and another layer of which provides the moisture-impermeable properties. The latter has a low adhesive affinity for the first layer whereby easy access may be had to the package when the wrapping material has been overlapped and fin sealed along overhanging lateral portions.

This invention relates to the packaging of food products and, more particularly, to the packaging of such food products so as to prevent a loss of moisture content therefrom. The invention also relates to a wrapping material of novel construction which provides for effective sealing of food products and which is easily opened to provide for convenient access to the food product. The invention encompasses the wrapping material, the food package and the method of making the food package.

Heretofore it has been customary to wrap individually sliced food products, such as individual slices of cheese, by wrapping them in a plastic material, such as cellophane. However, it has been observed that this material absorbs moisture from the product which results not only in a loss of net weight for the slices as packaged but also in an overly dry taste and texture and a deterioration in flavor. Where cheese is concerned, certain manufacturers have attempted to overcome these deleterious effects by adding an extra amount of cheese to each slice. While this procedure helps to maintain the net weight as posted on the label despite the loss of moisture, it is obviously uneconomical and does not prevent deterioration of quality caused by the dryness.

Accordingly, it is a primary purpose of the present invention to provide an inexpensive, moisture-proof package for individually sliced food products wherein the food products are enclosed within a novel sheet material. The latter comprises a laminate having a first layer of plastic which is capable of being heat sealed to itself and a second layer intimately laminated throughout to the first layer with the second layer being relatively non-absorbent and moisture-impermeable to food products. In addition, the second layer has a higher melting point than the first layer so that heat may be passed through the second layers to seal the first layers together. The individually sliced food product is wrapped in the flexible wrapping material with the ends of the wrapping material overlapped. The wrapping material is sufficiently wide to provide overhanding lateral portions which are fin sealed in conventional manner by the application of heat and pressure. The second layer has a low adhesive affinity for the first layer whereby easy access to the package may be had along a line of separation beneath the overlapped ends of the wrapping material.

2

In specific embodiments of the foregoing invention, the first layer is preferably made from polyethylene and the second layer is preferably made from polypropylene with the polypropylene layer being from 1 to 3 times as thick as the polyethylene layer. As an optional feature, the terminal portion of the overlapped end of the wrapping material may be folded under so as to provide means to grasp an end of the package material when it is desired to open the package.

The inherent advantages and improvements of the present invention will become more readily apparent upon considering the following detailed description of the invention and by reference to the drawings in which:

FIG. 1 is a perspective view of a package made in accordance with the present invention;

FIG. 2 is a side elevation view taken in vertical cross section along line 2—2 of FIG. 1;

FIG. 3 is a fragmentary side elevation view in vertical cross section showing a portion of FIG. 2 drawn to an enlarged scale;

FIG. 4 is a fragmentary side elevation view in vertical cross section taken along line 4—4 of FIG. 1 and drawn to an enlarged scale; and FIG. 5 is a perspective view of the package of FIG. 1 after it has been opened.

While the various features of this invention are hereinafter illustrated and described with respect to a cheese product and more particularly to individual slices of cheese, it is to be understood that the various features of this invention can be utilized singly or in various combinations thereof with other food products and with food products in forms other than individual slices. Therefore, this invention is not to be limited merely to the embodiments illustrated in the drawings because the drawings are utilized herein merely to illustrate one of a wide variety of uses of this invention.

Referring now to FIGS. 1 and 2 of the drawings, there is illustrated a wrapped package, generally designated 10. A food product 12, such as an individual slice of cheese, is contained within the package 10. A flexible wrapping material is wrapped completely around the food product 12 beginning at the top thereof and proceeding to envelope the entire slice of cheese.

The wrapping material consists of a first layer of plastic film 14 which contacts the top and bottom of the food product 12 and which is capable of being heat sealed to itself. Such a material may be polyethylene, for example. A second layer of plastic material 16 is intimately laminated throughout its surface area to the first layer 14 of polyethylene.

The flexible laminated wrapping material has a width sufficient to provide overhanging portions on opposed sides of the sliced food product 12 whereby the overhanging portions may be fin sealed at 18 and 20. In addition, the wrapping material has a length sufficient to provide an overlapped portion 22 whereby the overhanging portions of the overlapped ends of the wrapping material may simultaneously be tightly closed but not sealed at 18*a* and 20*a* when the fin seals 18 and 20 are made. This tight closing without sealing allows for easy opening of the overlapped portion.

The second layer of plastic material 16 not only provides the non-absorbent and moisture-impermeable qualities to the wrapping material but also has a low adhesive affinity for the first layer of plastic material.

As best shown in FIG. 4, the fin 20 is sealed at the interface between the first layers 14. The second layer has a low adhesive affinity and the layers may be separated or delaminated from each other at interfaces 16*a* or 16*b*.

This delamination at interfaces 16*a* or 16*b* provides for easy opening of the package. As shown in FIG. 5, the delamination may take place at interface 16*a*. The delamination is accompanied by longitudinal tearing of the first layer 14 along lines 27 and 28. It is to be understood that delamination may occur at both interfaces 16*a* and 16*b* in which event the first layer would tear laterally along lines 14*c* and 14*d* (FIG. 5) which would occur in a random manner.

The package of the present invention includes a wrapping material having non-absorbent and moisture-impermeable qualities. Moreover, the wrapper is constructed as to be opened easily.

As an optional feature, the terminal portion of the overlapped portion 22 may be provided with a folded under edge 26 so as to facilitate an easy grasp of the edge of the overlapped portion 22 of the packaging material.

In the manufacture of the wrapping material it is preferred to add a slip enhancing material to the polypropylene layer 16. This may be accomplished conveniently by the application of a light starch dust to the polypropylene layer 16 after it emerges from the conventional casting roll while enroute to final rewinding. One suitable material is Oxy-Dry #644 which is an industrial food grade starch marketed by Oxy-Dry Sprayer Corp. of Chicago, Ill.

The wrapping material may be made in various thicknesses. Preferably, the wrapper is 1.25 mils (0.00125 inch) in total caliper, comprising 1.05 mils polypropylene and 0.20 mil polyethylene. The polypropylene layer may vary between 0.75 mil to 2.00 mils. The polyethylene layer may vary from 0.1 mil to 0.5 mil. The foregoing are preferred ranges of thickness and others may be selected so to achieve maximum economy without sacrificing the non-absorbent, water-impermeable and easy opening qualities of the wrapper.

In the process for making the film, the components are extruded simultaneously through a slot die extruder. The resins are actually united in the die which has a manifold permitting the components to develop their respective layers. The percentage of the layers is controlled principally by adjustment of manifolds within the die and controlling the amount of resin pumped into the die. While it is desirable to use as much of a percentage of polyethylene as possible because of its lower cost, in all instances to date the film has consisted of polypropylene having a thickness from one to six times the thickness of polyethylene.

While the invention and many of its attendant advantages will be apparent from the foregoing description, a review of the method steps practiced in manufacturing the package will effectively summarize the features of this invention. An individual sliced food product, such as a slice of cheese, is wrapped in the flexible wrapping material which has a sufficient length to provide an overlapped end condition and which is sufficiently wide to provide overhanging lateral portions. As an optional step, the terminal end of the overlapped portion may be folded under to provide an easy access to the package. The overhanging lateral portions are then fin sealed at 18 and 20 and are tightly closed at 18*a* and 20*a* thereby obtaining an effectively sealed food product.

Because the polypropylene layer 16 has a low adhesive affinity for the polyethylene layer 14, the line of separation 24 beneath the overlapped portion 22 provides an easy access to the package 10 when the folded under portion 26 is grasped and pulled to the right in FIG. 3.

It is to be understood that the foregoing sheet material construction may be a substrate portion of a lamination including layers of other material which have protective properties for packaging food or other products. Such other material may include polyvinylchloride, Saran, Mylar, nylon and the like. Such layer materials may be combined in known manners according to the protective properties desired. The sheet material of the present invention would provide protective properties and an easy opening feature to such laminations.

It is thought that the invention and many of its attendant advantages will be understood from the foregoing description, and it will be apparent that various changes may be made in the form, construction and arrangement of the parts without departing from the spirit and scope of the invention, the form hereinbefore described being merely a preferred embodiment thereof.

I claim:

1. A food package comprising (a) an individually sliced food product, (b) a flexible wrapping material wrapped around said individually sliced food product and overlapped upon itself, (c) said flexible wrapping material having a width sufficient to provide overhanging portions on opposed sides of said individually sliced food product, (d) said flexible wrapping material comprising (1) a first layer of plastic material, (2) a second layer of plastic material intimately laminated throughout to said first layer, (a) said second layer being non-absorbent and moisture-impermeable to said food product, (3) said second layer having a low adhesive affinity for said first layer to provide easy access to said package where said wrapping material is overlapped upon itself, (e) said overhanging portions of said flexible wrapping material being heat sealed together.

2. A food package as defined in claim 1 wherein said first layer is polyethylene and said second layer is polypropylene.

3. A food package as defined in claim 2 wherein said polypropylene layer is from one to three times as thick as said polyethylene layer.

4. A food package as defined in claim 1 wherein the terminal portion of said overlapped flexible wrapping material has a folded under edge portion to permit easy opening of said package.

5. A food package as defined in claim 1 wherein a slip enhancing coating is applied to said second layer of plastic material.

6. A method of making a package containing an individually wrapped sliced food product comprising the steps of (a) wrapping a flexible wrapping material around an individual slice of food product, (b) overlapping the ends of said wrapping material, (1) said wrapping material being sufficiently wide to provide overhanging lateral portions including the overlapped ends thereof, (c) and fin sealing overhanging lateral portions of said wrapping material by the application of heat and pressure, (1) said wrapping material comprising (a) a first layer of plastic material which is heat sealable to itself, (b) a second layer of plastic material intimately laminated throughout to said first layer, (1) said second layer being non-absorbent and moisture-impermeable to food products, (c) said second layer having a low adhesive affinity for said first layer whereby easy access to said package is had at the overlapped ends of said wrapping material.

7. A method of making a package as defined in claim 6 including the additional step of adding a slip enhancing coating to said second layer of plastic material.

8. A method of making a package as defined in claim 6 including the additional step of folding under the terminal portion of the overlapped end of said wrapping material.

9. A method of making a package as defined in claim 8 including the additional step of adding a slip enhancing coating to said second layer of plastic material.

10. A method of making a package as defined in claim 6 wherein said first layer is polyethylene and said second layer is polypropylene.

11. A method of making a package as defined in claim 10 wherein said polypropylene layer is more than twice as thick as said polyethylene layer.

References Cited

UNITED STATES PATENTS

| | | | |
|---|---|---|---|
| 2,955,045 | 10/1960 | Coffee et al. | 99—178 |
| 3,022,613 | 2/1962 | Powers. | |
| 3,111,449 | 11/1963 | Gold et al. | |
| 3,248,040 | 4/1966 | Friedman. | |
| 3,274,004 | 9/1966 | Curler et al. | 99—178 X |
| 3,340,089 | 9/1967 | Bougie | 99—178 |

TIM R. MILES, Primary Examiner

U.S. Cl. X.R.

99—178